Figure 1:
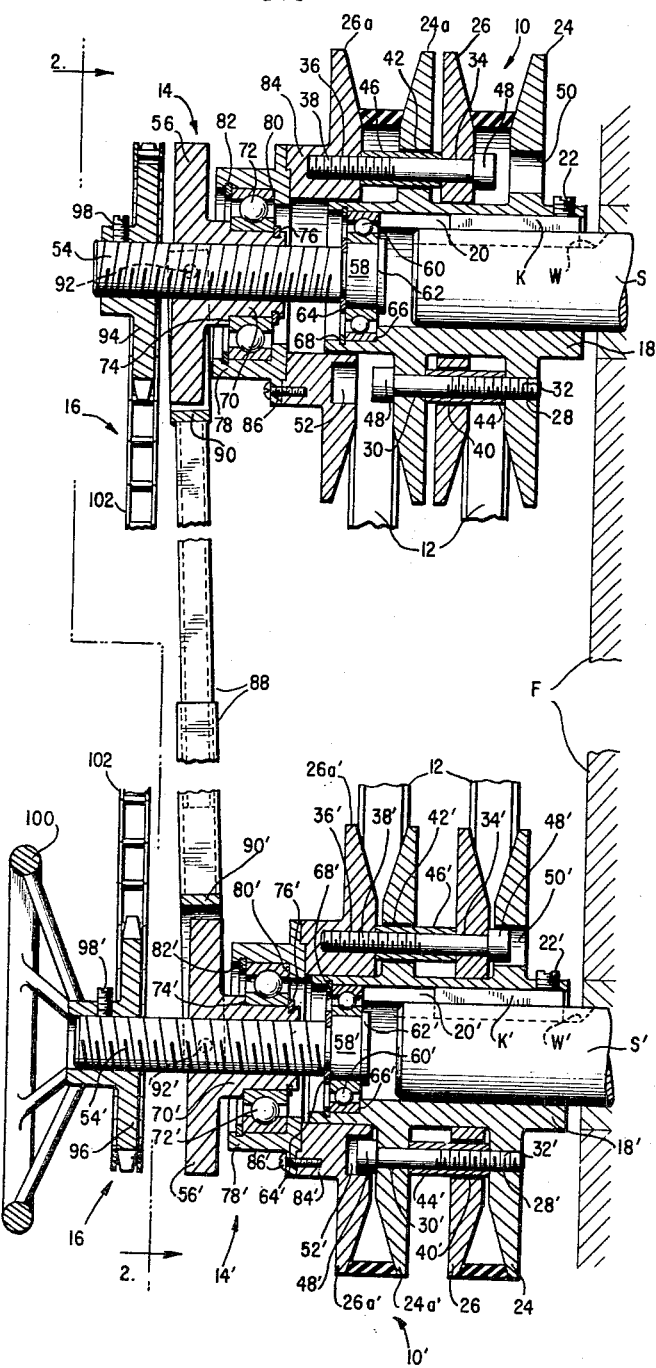

April 27, 1965  F. I. ROBERTSON, JR  3,180,163
VARIABLE SPEED TRANSMISSION
Filed Oct. 15, 1962

INVENTOR.
FIELD I. ROBERTSON, JR
BY
*Imirie and Smiley*
ATTORNEY 3,180,163
VARIABLE SPEED TRANSMISSION
Field Ira Robertson, Jr., Richmond, Va., assignor to The Inta-Roto Machine Company, Inc., Richmond, Va., a corporation of Virginia
Filed Oct. 15, 1962, Ser. No. 230,341
1 Claim. (Cl. 74—230.17)

This invention relates to improvements in variable speed drives of the type employing variable pitch V-belt pulleys, and more particularly to an improved and simplified structure and assembly capable of ready adaptation to any pair of parallel shafts and quick tensioning adjustment thereof.

Heretofore, variable speed drives employing variable pitch V-belt pulleys have been custom designed for mounting on a particular machine. This requires complicated and costly supporting frame work which usually is mounted directly on the machine frame or on the respective shafts, and rigidly connected through the worm shaft that is used for adjusting simultaneously the pitch of the pulleys to regulate the transmission speed. Moreover, in order to tension the transmission belts, it has been the practice to use spring biased follower rollers engaging the belts, which are subject to variation in pressure and breakage, or to adjust one of the pulleys individually by complicated coupling mechanism associated with the worm shaft.

Having in mind the defects of the prior art structures, it is the principal object of the present invention to provide a variable speed drive of the mentioned type that is readily applicable to parallel shafts in any machine whether during assembly or previously built, and regardless of the relative spacing between such shafts.

Another object of the invention is to provide a variable speed drive which is highly simplified and economical in construction, very easy to manipulate without the necessity for stopping the driving unit, and which eliminates entirely the necessity for the more complex and costly worm and worm gear types of adjusting means, clutches, clamps and the like commonly employed in the prior art.

Still another object of the invention is to provide a variable speed belt drive wherein the transmission belt or belts may be readily tensioned during operation of the drive.

A further object of the invention is to provide a variable speed drive having simplicity of design and construction, efficiency of operation, and economy of manufacturing.

Figure 2:
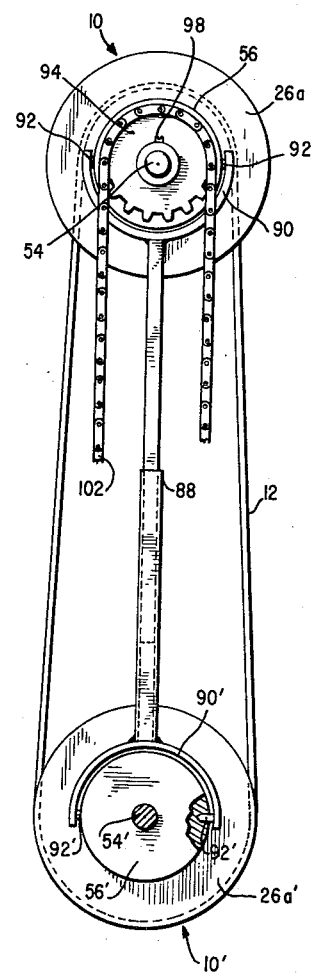

The novel features that are considered characteristic of the invention are set forth with particularity in the appended claim. This invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a central vertical section, partly broken away, through a variable speed drive according to the invention, and FIG. 2 is a transverse vertical section, on a reduced scale, parts broken away, taken on line 2—2 of FIG. 1.

Referring to the drawing in detail, specifically to FIG. 1, a variable speed drive in accordance with the present invention is shown as coupling a pair of parallel shafts S and S', either of which may be the drive and the other the driven shaft, journaled in a machine frame F, and having the usual ways W, W' seating keys K, K' in their outer ends. As is usual in drives of this type, the present invention comprises a pair of variable pitch pulley assemblies 10, 10' respectively mounted on the ends of the shafts S, S' and having transmission belt means 12 trained thereon, each of said pulley assemblies 10, 10' including threaded means 14, 14' for adjusting the pitch of said assemblies, respectively, and gear means 16 connecting said threaded means for simultaneously operating the latter.

As is well-known, the pulley assemblies 10, 10' may comprise one or more sheaves and as a plurality of sheaves usually are employed, the present assemblies are shown as including two sheaves each, although it will be understood that each assembly may embody only one or more than two sheaves. Moreover, as one of the advantages of the invention resides in simplicity of construction and reduction in the number of parts, the structures of the assemblies preferably are substantially identical and are described hereinafter simultaneously, the parts of the two assemblies being distinguished by primed characters.

Each of the pulley assemblies 10, 10' comprises a sleeve hub 18, 18' for mounting on a shaft S, S' or on an adaptor mounted on such shaft if there is a size difference between the hub and shaft, the hub having an internal keyway 20, 20' for nesting the key K, K', and clamp means such as a set screw 22, 22' for securing the hub in position. A first coned sheave section or flange 24, 24' is rigidly fixed on the hub 18, 18', preferably integral therewith, and a second, similarly disposed coned sheave section 24a, 24a' is also rigidly fixed on said hub 18, 18' in spaced relation to the section 24, 24'.

The sheave sections 24, 24a, 24', 24a' constitute the nonshiftable sections of the dual variable pitch sheave assembly 10, 10'. A pair of shiftable coned sheave sections or flanges 26, 26' and 26a, 26a' are removably mounted on the hub 18, 18' for cooperation respectively with the sections 24, 24' and 24a, 24a'. The section 26, 26' is disposed between the sections 24, 24' and 24a, 24a' and is rigidly connected to the other shiftable section 26a, 26a', which is on the opposite side of the section 24a, 24a', for unitary movement axially of the hub. Obviously, the intermediate sections 26, 26' and 24a, 24a' may be identical in structure but in reverse relation.

All of said sections are connected for unitary angular movement with the hub. To provide this interconnection between all of the sections, the pairs of like sections are provided with bolt holes with the holes in each pair disposed on axes parallel with the hub axis. Specifically, the fixed section 24, 24' has at least one bolt hole 28, 28' and the other fixed section 24a, 24a' has at least one axially aligned bolt hole 30, 30', with at least one of said holes in each pair being internally threaded to receive and secure a bolt 32, 32'. Similarly, the shiftable sections 26, 26' and 26a, 26a' are provided respectively with bolt holes 34, 34' and 36, 36', at least one of each pair of holes being internally threaded to secure a bolt 38, 38'.

The intermediate sections 26, 26' and 24a, 24a' are each provided with bores 40, 40' and 42, 42' for movably accommodating sleeves 44, 44' and 46, 46' respectively surrounding the bolts 32, 32' and 38, 38', and spacing the pairs of like sections as well as securing all of said sections together and, through the first fixed section 24, 24', with the hub for unitary angular or rotational movement. In the structure shown, the threaded bolt holes are disposed in the outermost sections, and the bolt heads 48, 48' are disposed between the cooperating sets of sections.

The foregoing arrangement of the bolts is preferred because of difficulty in inserting the bolts 38, 38' from the outer side of the outer sections 26a, 26a', as will become more apparent hereinafter. Unless the bolt heads 48, 48' are countersunk within the respective sections against which they abut, the outermost sections 24, 24' and 26a, 26a' are provided with openings 50, 50' and 52, 52' to accommodate the bolt heads when the sets of flanges are closely positioned, as illustrated by the assembly 10' in FIG. 1. The openings 50, 50' in the section 24, 24' are through openings to facilitate assembly of the bolts 38, 38'.

The threaded means 14, 14' for shifting the sheave sections 26, 26', 26a, 26a' to adjust the pitch of said pulley assemblies 10, 10' comprises a threaded shank 54, 54' journaled in but fixed axially relative to the hub 18, 18', and a nut or internally threaded collar 56, 56' threaded on said shank for axial movement therealong and connected with the shiftable sheave sections for moving them in unison toward and from the nonshiftable sheave sections to vary the pitch of the dual sheave assembly. At its inner end, the shank 54, 54' has an integral cylindrical head 58, 58', upon which an antifriction bearing 60, 60' is mounted, and releasably secured against a flange 62, 62' by a snap ring 64, 64'. The outer race of the bearing 60, 60' is held within the bore of the hub 18, 18' against a shoulder 66, 66' by a snap ring 68, 68'.

The nut 56, 56' has a reduced cylindrical portion 70, 70' upon which is seated an antifriction bearing 72, 72' that is retained against a shoulder 74, 74' of the nut by a snap ring 76, 76' on the seat portion 70, 70'. The bearing 72, 72' is seated within a housing 78, 78' and retained against a shoulder 80, 80' thereof by a snap ring 82, 82'. The housing 78, 78' is rigidly fixed with a ring 84, 84' surrounding the hub 18, 18' and secured to the shiftable sheave sections. In the form shown, the bearing housing 78, 78' is removably secured to the ring 84, 84' by screws 86, 86', and the ring 84, 84' is integral with the outer sheave section 26a, 26a' but if the relation of the sheave sections is reversed, the shiftable sections may be secured to the ring by longer bolts and a second spacer sleeve.

The nuts 56 and 56' are held against rotation and linked together by a two-part telescopic extensible link 88, the opposite ends of which carry yokes 90, 90' rigid therewith and pivotally secured to the nuts 56 and 56' at diametrically opposite sides thereof by yoke pivot pins 92, 92'. By this means, the two nuts 56 and 56' are held against rotation when the threaded shank 54, 54' are turned relative thereto for varying the pitch of each dual sheave unit 10 and 10'. Moreover, the extensible link 88 extends and retracts automatically to allow the necessary axial movement of each nut and associated elements when the shiftable sheave sections 26, 26' and 26a, 26a' are moved axially toward and from the nonshiftable sections 24, 24' and 24a, 24a'. Additionally, the extensible link enables mounting of the hubs 18 and 18' on sets of shafts S and S' which are spaced different distances.

The gear means 16 for turning the threaded shanks 54 and 54' in unison or independently comprises sprocket gears or wheels 94 and 96 mounted rotatably upon the shanks 54 and 54', respectively, and adapted to be releasably locked to the screw shanks by readily adjustable set screws 98 and 98'. At least one of the sprocket gears is provided with a manually operated crank means to facilitate turning it, a handwheel 100 being shown on the wheel 96. The sprocket gears 94 and 96 are drivingly interconnected by a suitable sprocket chain 102.

During operation of the variable speed drive, while both of the set screws 98, 98' are tightened against the screw shanks 54, 54', the handwheel 100 may be turned whereupon both of the adjusting screw shanks 54 and 54' will be turned in unison and in the same direction. However, since one screw shank has a right-hand screw thread and the other one has a left-hand screw thread, the mating sections of the variable pitch sheaves of one unit 10, 10' will be opened or separated axially, while the corresponding sections of the variable pitch sheaves of the other unit 10, 10' will be closed or shifted together axially to provide the desired change in speed of the output shaft S or S'.

When it is desired to tighten the transmission belts 12 without effecting a major variation in speed of the output shaft, it is merely necessary to loosen one of the set screws 98 or 98' and to then turn the handwheel 100 as before described. The sprocket with the loosened set screw then merely idles on its shank while the other shank is driven to adjust its pulley assembly to tighten the belts 12. When the belts 12 are thus tightened, the loosened set screw is again tightened against the screw shank and the variable speed drive will continue to transmit power at the selected speed in the usual manner. If the tightening of the belts alters the transmission speed, the handwheel may be turned to adjust both units 10, 10' to transmit the desired speed.

From the foregoing, it is evident that a variable speed transmission according to the present invention has great simplicity and economy in construction, as well as versatility in adaptation and use. The transmission is readily adaptable to a pair of shafts regardless of their spacing as the only variation is in the extension of the link 88 and the length of the belts 12 and chain 102. The link 88 eliminates complicated frame structures for preventing rotation of the nuts 56, 56' while accommodating their axial movement.

The chain and sprocket gear means 16 enables accurate adjustment of the threaded means but eliminates the necessity of a worm shaft and frame structures for journaling such a shaft, and also freely exposes the set screws 98, 98' to enable ready release of one such screws for adjusting one of the sheave units 10, 10' for tightening the transmission belts 12. The invention provides a positive, efficient and economical means which is easy to manipulate and requires only a screw driver to operate and reset.

Although a certain specific embodiment of the invention has been shown and described, it is obvious that many modifications thereof are possible. The invention, therefore, is not to be restricted except insofar as is necessitated by the prior art and by the spirit of the appended claim.

What is claimed is:

A variable speed transmission comprising a pair of variable pitch pulley units with transmission belt means trained thereon, each of said pulley units including a hub removably mountable in fixed relation on a shaft, at least one coned sheave section fixed on said hub, at least one coned sheave section mounted on said hub to rotate therewith and shiftable axially thereon relative to said fixed section, threaded means including a screw shank rotatably supported in fixed axial relation by said hub, a nut threaded on said shank for axial movement thereon, bearing means rotatively connecting said nut with said shiftable sheave section for moving it relative to said fixed sheave section, chain and sprocket gear means connected with said threaded shank and between the shanks of both pulley units for simultaneously rotating said shanks, said shanks having threads of opposite pitch to move said nuts in relative opposite directions, and means securing said nuts against rotational movement whereby said nuts are driven along said shanks upon rotation of the latter, said nut securing means comprising extensible link means extending between said nuts and having its respective ends pivotally connected to said nuts, said link means including a pair of telescopic elements each having a free end with a yoke rigidly fixed thereon and respectively spanning one of said nuts and pivotally connected thereto by axially aligned, oppositely disposed pins.

References Cited by the Examiner

UNITED STATES PATENTS

| | | | |
|---|---|---|---|
| 676,077 | 6/01 | Oliverson et al. | 74—230.17 |
| 2,130,823 | 9/38 | Wilson | 74—230.17 |
| 2,184,395 | 12/39 | Morse | 74—230.17 |
| 2,262,782 | 11/41 | Strom | 74—230.17 |

DON A. WAITE, *Primary Examiner.*

MILTON KAUFMAN, *Examiner.*